Patented Sept. 15, 1931

1,823,754

UNITED STATES PATENT OFFICE

CHOJIRO NITTA, OF OSAKA, JAPAN

PROCESS OF MAKING LEATHER

No Drawing. Application filed March 31, 1930, Serial No. 440,359½, and in Japan November 21, 1929.

This invention relates to a process for making leather which can be used for coating rollers to be used for spinning machines.

The leather which is used to coat the rollers of spinning machines is limited to that made of sheep's skin, because no other animal skin possesses the required qualities as to compactness, smoothness, elasticity, etc. for the purpose. It is found, however, that an animal skin of low price such as ox skin can be used for coating the rollers if the skin has been treated following to the successive steps below mentioned.

In the ordinary preparation of finished leather, both the hair side and the flesh side, that is, the side on which hair grew and the side adjacent the flesh, are ground in such manner as to remove the rough outer layers on each side.

According to present invention, tanned animal skin with its so called "hair side" remaining, that is with its surface which contained the hair which has since been removed, but which surface has not been smoothed, or touched, is placed in a closed drum, which is filled with water at a temperature not higher than 45° C. containing rice bran of about 0.4 per cent in volume, and the drum is rotated for about one hour in order to stir the water in the drum. The water in the drum is then replaced with pure water, and the drum is rotated for another hour. The skin is then taken out of the drum and the water absorbed in the skin is squeezed out.

By the treatment of the skin in the water with rice bran tannic acid and oily substances contained in the tanned skin are removed, and the skin is made softened and its hair side becomes strong. The quantity of water to be filled in the drum for removing tannic acid should be about ten to fifteen times by weight of the skin to be treated.

The skin is next preferably stretched so as to remove rumples which may be made in course of squeezing, and is dried by suitable means.

The dried skin is then softened by means of rubbing or similar process, and the hair side is next ground with an emery grinder of any type in order to remove its rough upper layer and to bring its compact inner layer to the surface. The ground surface is then calendered by rubbing with a smooth surface such as a glass plate. The flesh side is next shaved till the skin gets to a required thickness, and the shaved surface is made rough so as to easily adhere to woolen cloth which composes the surface of the rollers. As the last or finishing step, the hair side is calendered with an electric trowel.

The leather thus treated possesses substantially the same properties as sheep's skin, and can be used for coating of rollers for spinning machines.

I claim:

A process for making leather to be used for the coating of the woolen cloth under surface of rollers for spinning machines, comprising treating the tanned animal skin with its hair side untouched in water with rice bran, drying the skin after the treatment, rubbing the skin after it is dried to soften the same, removing the rough upper layer of the hair side of the skin, calendering the ground surface, and shaving the flesh side of the skin to the required thickness and to make the surface rough so as to be easily adhered to the said woolen cloth.

In testimony whereof I affix my signature.

CHOJIRO NITTA.